United States Patent
Ericsson et al.

(10) Patent No.: US 9,872,271 B2
(45) Date of Patent: Jan. 16, 2018

(54) TRACKING LOCATIONS OF A COMPUTING DEVICE AND RECORDING LOCATIONS OF SENSOR UNITS

(71) Applicants: Bo E. Ericsson, Los Gatos, CA (US);
Tanuj Mohan, Mountain View, CA (US)

(72) Inventors: Bo E. Ericsson, Los Gatos, CA (US);
Tanuj Mohan, Mountain View, CA (US)

(73) Assignee: enLighted, Inc., Sunnyvale, CA (US)

( * ) Notice: Subject to any disclaimer, the term of this patent is extended or adjusted under 35 U.S.C. 154(b) by 492 days.

(21) Appl. No.: 14/262,722

(22) Filed: Apr. 26, 2014

(65) Prior Publication Data

US 2014/0235269 A1    Aug. 21, 2014

Related U.S. Application Data

(63) Continuation-in-part of application No. 14/040,640, filed on Sep. 28, 2013, which is a continuation-in-part of application No. 12/874,331, filed on Sep. 2, 2010, now Pat. No. 8,587,225.

(60) Provisional application No. 61/790,037, filed on Mar. 15, 2013.

(51) Int. Cl.
*G05B 21/00* (2006.01)
*H04W 64/00* (2009.01)
*H05B 37/02* (2006.01)
*G01S 5/16* (2006.01)

(52) U.S. Cl.
CPC ...... *H04W 64/003* (2013.01); *H05B 37/0272* (2013.01); *G01S 5/16* (2013.01)

(58) Field of Classification Search
CPC .................................................. H04W 64/003
See application file for complete search history.

(56) References Cited

U.S. PATENT DOCUMENTS

| | | |
|---|---|---|
| 5,101,141 A | 3/1992 | Warner et al. |
| 5,179,324 A | 1/1993 | Audbert |
| 5,191,265 A | 3/1993 | D'Aleo et al. |
| 5,283,516 A | 2/1994 | Lohoff |
| 5,812,422 A | 9/1998 | Lyons |
| 6,057,654 A | 5/2000 | Cousy et al. |

(Continued)

FOREIGN PATENT DOCUMENTS

WO    WO 2012001428    1/2012

OTHER PUBLICATIONS

Shin et al. IEEE Transactions on Systems, Man, and Cybernetics—Part C: Applications and Review. vol. 42, No. 6. Nov. 2012, Titled "Unsupervised Construction of an Indoor Floor Plan Using a Smartphone".

(Continued)

*Primary Examiner* — James D. Rutten
(74) *Attorney, Agent, or Firm* — Brian R. Short

(57) ABSTRACT

Systems, methods and apparatuses of tracking locations of a computing device and recording locations of sensor units are disclosed. One method includes tracking a location of a computing device within the area, coupling the computing device with a least one of a plurality of sensor units, and identifying and recording a location of the at least one of the plurality of sensor units based on a tracked location of the computing device and an identifier of the at least one of the plurality of sensor units.

22 Claims, 8 Drawing Sheets

(56) References Cited

U.S. PATENT DOCUMENTS

| | | |
|---|---|---|
| 6,188,181 B1 | 2/2001 | Sinha et al. |
| 6,342,994 B1 | 1/2002 | Cousy et al. |
| 6,548,967 B1 | 4/2003 | Dowling et al. |
| 7,309,985 B2 | 12/2007 | Eggers et al. |
| 7,348,736 B2 | 3/2008 | Piepgras et al. |
| 7,389,181 B2 * | 6/2008 | Meadow ............ G06F 17/30241 342/357.31 |
| 7,437,596 B2 | 10/2008 | McFarland |
| 7,382,271 B2 | 12/2008 | McFarland |
| 7,550,931 B2 | 6/2009 | Lys et al. |
| 7,566,137 B2 | 7/2009 | Veskovic |
| 7,623,042 B2 | 11/2009 | Huizenga |
| 7,710,271 B2 * | 5/2010 | Frumau ............ H05B 37/0272 250/227.21 |
| 7,769,490 B2 * | 8/2010 | Abramson ............ F04D 29/30 180/167 |
| 7,783,284 B1 * | 8/2010 | Laux ............ H04L 41/12 455/411 |
| 7,792,956 B2 | 9/2010 | Choong et al. |
| 7,925,384 B2 | 4/2011 | Huizenga et al. |
| 7,973,678 B2 * | 7/2011 | Petricoin, Jr. ......... G01S 5/0018 340/990 |
| 8,344,665 B2 | 1/2013 | Verfueth et al. |
| 8,368,321 B2 | 2/2013 | Chemel et al. |
| 8,571,411 B2 | 10/2013 | Pederson et al. |
| 8,796,958 B2 | 8/2014 | Billig et al. |
| 8,860,316 B2 | 10/2014 | Barrilleaux |
| 9,006,996 B2 | 4/2015 | Mohan |
| 9,351,381 B2 | 5/2016 | Verfueth et al. |
| 2004/0014475 A1 | 1/2004 | Saito et al. |
| 2004/0002792 A1 | 10/2004 | Hoffknecht |
| 2005/0169643 A1 | 8/2005 | Franklin |
| 2005/0174960 A1 | 8/2005 | Perlman |
| 2005/0258957 A1 * | 11/2005 | Krumm ............ G01C 21/206 340/539.13 |
| 2006/0026170 A1 * | 2/2006 | Kreitler ............ G06F 17/30241 |
| 2006/0074494 A1 | 4/2006 | McFarland |
| 2006/0241816 A1 * | 10/2006 | Draaijer ............ H05B 37/0272 700/286 |
| 2006/0275040 A1 | 12/2006 | Franklin |
| 2007/0057807 A1 | 3/2007 | Walters et al. |
| 2007/0061050 A1 | 3/2007 | Hoffknecht |
| 2007/0077941 A1 * | 4/2007 | Gonia ............ G01S 1/66 455/456.1 |
| 2007/0086128 A1 | 4/2007 | Lane et al. |
| 2007/0215794 A1 | 9/2007 | Cernasov et al. |
| 2007/0291483 A1 | 12/2007 | Lys |
| 2008/0074253 A1 * | 3/2008 | Jeffery ............ G07C 3/00 340/539.11 |
| 2008/0185597 A1 | 8/2008 | Veskovic et al. |
| 2008/0215235 A1 | 9/2008 | Stassenburg-Kleciak et al. |
| 2008/0218087 A1 | 9/2008 | Crouse et al. |
| 2008/0244104 A1 | 10/2008 | Clemente |
| 2008/0265796 A1 | 10/2008 | Null |
| 2009/0002981 A1 * | 1/2009 | Knibbe ............ G01S 5/14 362/233 |
| 2009/0026966 A1 | 1/2009 | Budde et al. |
| 2009/0179596 A1 | 7/2009 | Willaert et al. |
| 2009/0195161 A1 | 8/2009 | Lane et al. |
| 2009/0267540 A1 | 10/2009 | Chemel et al. |
| 2010/0026479 A1 | 2/2010 | Tran |
| 2010/0034386 A1 | 2/2010 | Choong et al. |
| 2010/0135186 A1 | 6/2010 | Choong et al. |
| 2010/0264846 A1 | 10/2010 | Chemal et al. |
| 2010/0270933 A1 | 10/2010 | Chemal et al. |
| 2010/0295482 A1 | 11/2010 | Chemal et al. |
| 2010/0301777 A1 | 12/2010 | Chemal et al. |
| 2011/0031897 A1 | 2/2011 | Henig et al. |
| 2011/0037610 A1 * | 2/2011 | Andres ............ G08C 21/00 340/8.1 |
| 2011/0183685 A1 | 8/2011 | Burton et al. |
| 2011/0199010 A1 | 8/2011 | Henig et al. |
| 2012/0015665 A1 * | 1/2012 | Farley ............ G01S 5/0036 455/456.1 |
| 2012/0130632 A1 | 5/2012 | Bandyopadhyay et al. |
| 2012/0293075 A1 | 11/2012 | Engelen et al. |
| 2013/0131882 A1 | 5/2013 | Verfueth et al. |
| 2013/0275041 A1 * | 10/2013 | Yeh ............ G01S 5/0289 701/461 |
| 2013/0293877 A1 | 11/2013 | Ramer et al. |
| 2013/0326583 A1 | 12/2013 | Freihold et al. |
| 2014/0335893 A1 * | 11/2014 | Ronen ............ G01S 5/0252 455/456.1 |

OTHER PUBLICATIONS

Jung et al. "Emotional Image Processing Using Sensors in Mobile Device", 2013 IEE, 3 pages.

* cited by examiner

US 9,872,271 B2

TRACKING LOCATIONS OF A COMPUTING DEVICE AND RECORDING LOCATIONS OF SENSOR UNITS

RELATED APPLICATIONS

This patent application is a continuation-in-part (CIP) of U.S. patent application Ser. No. 14/040,640, filed Sep. 28, 2013, which claims priority to U.S. Provisional Patent Application No. 61/790,037, filed Mar. 15, 2013, and which is a continuation-in-part (CIP) of U.S. patent application Ser. No. 12/874,331, filed Sep. 2, 2010.

FIELD OF THE EMBODIMENTS

The described embodiments relate generally to a structure plan of a structure. More particularly, the described embodiments relate to apparatuses, methods and systems for tracking locations of a computing device and recording locations of sensor units.

BACKGROUND

Lighting control can be used to automatically control lighting under certain conditions, thereby conserving power. However, lighting control, specifically advanced lighting controls have not been widely adopted in the general commercial market because the installation, setup related costs and complexity have made these lighting systems prohibitively expensive for many commercial customers.

To improve installation productivity and accuracy, it is desirable to have methods, systems and apparatuses for tracking locations of a computing device and recording locations of sensor units.

SUMMARY

An embodiment includes a method of commissioning sensor units within an area. The method includes tracking a location of a computing device within the area, coupling the computing device with a least one of a plurality of sensor units, and identifying and recording a location of the at least one of the plurality of sensor units based on a tracked location of the computing device and an identifier of the at least one of the plurality of sensor units.

Another embodiment includes a computing apparatus. The computing apparatus is operative to track a plurality of locations of the computing apparatus while the computing apparatus is traveling within an area, couple with at least one of a plurality of sensor units, receive an identifier from the at least one of the plurality of sensor units after coupling with the at least one of a plurality of sensor units, identify and record a location of the at least one of the plurality of sensor units based on a tracked plurality of locations of the computing apparatus and the identifier of the at least one of the plurality of sensor units.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in an apparatuses, systems and methods of tracking locations of a mobile computing device as the mobile computing device travels amongst devices (such as, lighting fixtures, temperature control devices, or other types of sensor units) of an area. Further, for the described embodiments, the mobile computing device receives identification information of the devices (sensor units), and records locations of the devices based on the received identification information of the devices, and the tracked locations of the mobile computing device.

Figure 1A:
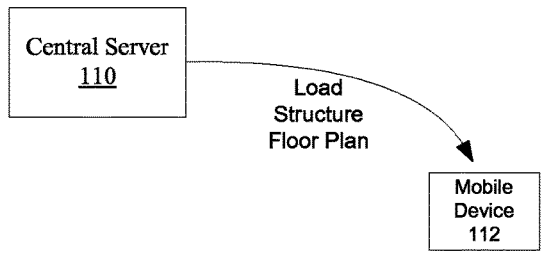
FIG. 1A shows a mobile computing device downloading a plan of a structure, according to an embodiment.

FIG. 1A shows a mobile computing device 112 downloading a plan of a structure from a central server 110, according to an embodiment. The structure can include, for example, a building, a parking lot, or any other structure that might include lighting devices or any other devices, such as, temperature and environmental control units.

For an embodiment, the plan provides for placement of the devices, but may not include exact or precise knowledge of which devices are placed at which location within the structure. That is, for example, the plan may provide approximate location of a device, but may not include information of which device is at which approximate location. The mobile computing device can use this information as a first data point in determining the precise locations of each of the devices within the structure.

Figure 1B:
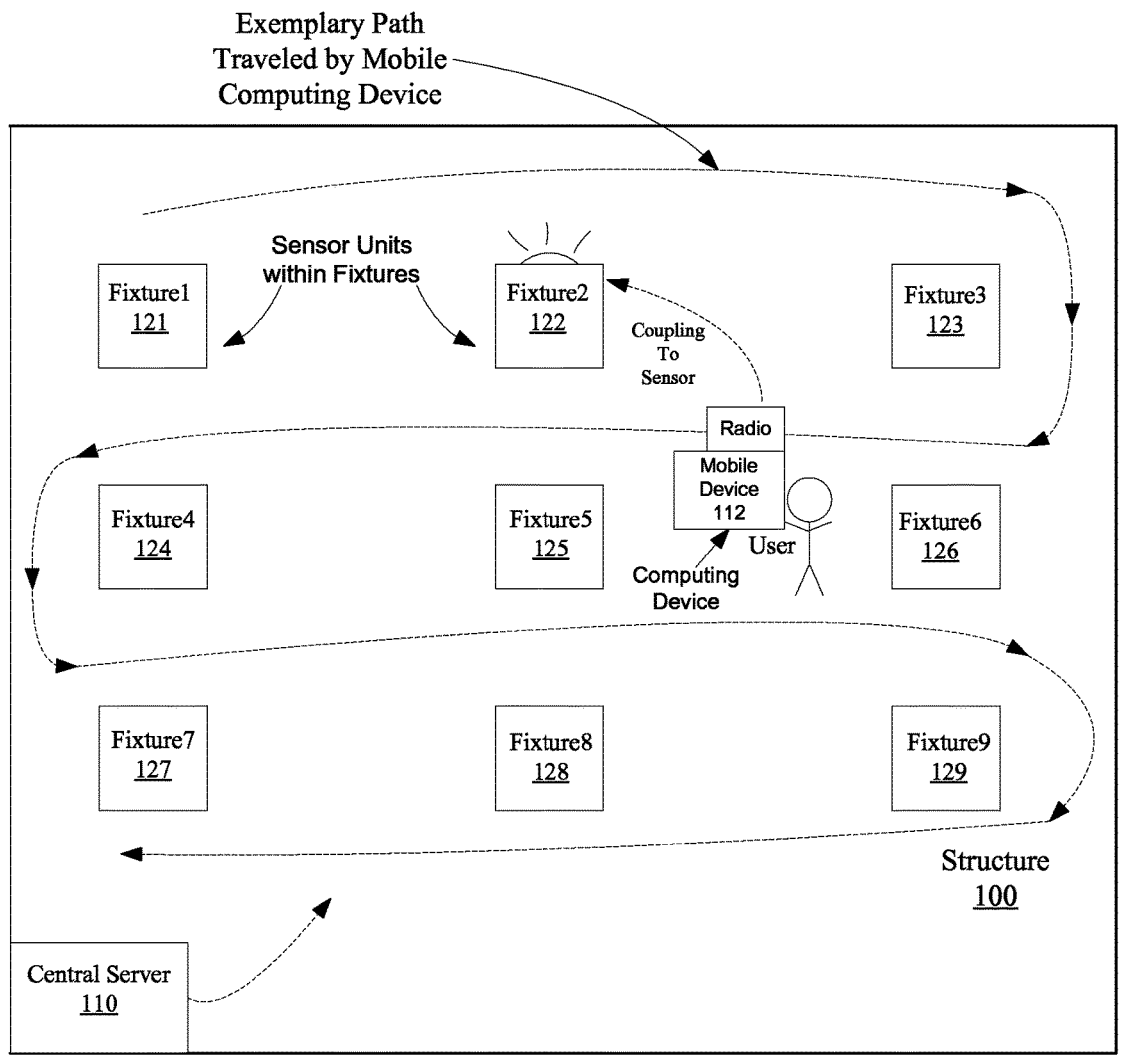
FIG. 1B shows a mobile computing device collecting information about devices (sensor units) within a structure including identifying and recording locations of the devices, according to an embodiment.

FIG. 1B shows a mobile computing device 112 collecting information about devices within a structure including identifying and recording locations of the devices, according to an embodiment. The mobile computing device 112 can include, for example, a smart mobile phone (such as an iPhone) or a laptop personal computer (which possibly include GPS capability). The mobile device can be used to communicate information from the mobile device to a sensor device using radio technology or other means of communications. This is, for example, to specify the location of the sensor, give a command to a sensor, and associate two or more sensors. Additionally, the mobile device can receive communications from a sensor device using radio technology or other means of communications. This allows a sensor device to be identified (and location recorded), give commands (such as direct motion), and provide results from an operation.

As shown, a structure 100 includes sensor units or devices (such as fixtures 121-129) that are located within or around the structure. While generally described as devices, for at least some embodiments, the devices include a variety of types of devices or sensor units, such as, but not limited to, a lighting fixture, a power receptacle, a power junction box, an environmental control unit, and/or a sensor unit utilized for lighting or environmental control. A general plan or floor plan of the structure may provide approximate placement of the devices within the structure. For an embodiment, the mobile computing device 112 is transported around the structure. One exemplary path of travel is shown.

As the mobile computing device 112 travels around the structure 100, for at least some embodiments, the mobile computing device 112 communicates with one or more of the devices 121-129.

For an embodiment, the mobile computing device 112 includes a radio that allows the mobile computing device to communicate with each of the devices 121-129 through a communications channel utilized by, for example, the central server 110, or gateways associated with the central server 110 to communicate with the devices 121-129.

For at least some other embodiments, the mobile computing device 112 communicates with one or more of the devices 121-129 by stimulating a sensor of the one or more devices, rather than communicating through the communications channel.

For at least some other embodiments, the mobile computing device communicates with one or more of the devices by stimulating a power load sensor (by, for example, loading the power load sensor with a specified load) of the one or more devices, rather than communicating through the communications channel.

For an embodiment, as the mobile computing device 112 moves within the structure, the mobile computing device 112 transmits a communications signal (or sensor stimulus) that is received by one or more of the devices 121-129.

For an embodiment, the devices 121-129 respond to the communication or communications signal from the mobile computing device with a device identifier. For an embodiment, the response includes communication of the device identifier to at least one of the mobile computing device and/or central server (alternatively referred to as a backend server) 110.

For an embodiment, the devices 121-129 respond to the communications signal with a device identifier and proximity dependent information. For an embodiment, the device identifier includes a MAC (media access control) address of the device. For an embodiment, the proximity dependent information includes a Link Quality Indicator (LQI) of the received communication signal (as will be described, the communication signal may be an RF (radio frequency) signals or a light signal). The LQI includes, for example, a received signal strength indicator (RSSI) that provides an indication of how close the mobile computing device is to the particular device.

For an embodiment, the proximity dependent information is communicated from the mobile computing device. That is, owing to the fact that the mobile computing device has just stimulated the sensor of one or more devices, the mobile computing device is proximate to the one or more devices, and therefore, can provide an approximate location of the simulated device or sensor unit.

For an embodiment, the proximity dependent information includes an ambient light level. For an embodiment, a current ambient light level is included within the LQI (link quality indicator). For an embodiment, the user or operator of, for example, the mobile device illuminates the sensor device with a beam of light. The sensor device senses the intensity of the beam of light, which can also server as the communication between the mobile device and the sensor device. Further, a light sensor of the sensor device senses an intensity of the received beam of light. In this use case, the operator could illuminate the sensor and immediately see which sensor is targeted in a user interface (UI) of the mobile device.

Further, for an embodiment in which a known load is applied to the sensor device (through, for example, a plug load device) the sensor device reports, for example, in the LQI data stream that it is being targeted, and therefore is immediately identified in the mobile device UI. Such described embodiments include approximating the location of the device based on the location of the mobile computing device.

For at least some embodiments, the transmit power of the mobile device is varied which adjusts, the size of the set of responding devices. For example, by sufficiently reducing the transmit power of the mobile device, only the nearest device or devices (to the mobile device) will respond, a procedure which may further augment the process of locating a device on a floor plan. That is, for example, by varying the transmit power an LQI list generated by the responding devices can be adjusted in length (that is, the number of responding devices is adjusted).

Further, at least some embodiments include adjusting the timing of the response of the devices. By adjusting the timing of the response of the devices, congestion due to near simultaneous responses can be alleviated. For an embodiment, the response times of the devices is randomly selected. For an embodiment, the response time of each device is selected based at least in part on a MAC (media access control) address of the device. For example, the response time of each device can be selected based on the last bit or byte of the MAC address of the device.

Typically, a user that is operating the mobile computing device has a visual of the devices the mobile computing device is communicating with, but this is not required. Upon receiving responses back from one or more of the devices, the mobile computing device can attempt to place each of the devices on the plan or floor plan based on the proximity dependent information. For example, typically the device responding with the highest or best LQI is the device located most proximate to the mobile computing device. Therefore, the mobile computing device can place the device on the plan based on this information.

For an embodiment, the mobile computing device (or a user of the mobile computing device) can confirm the placement by sending a message to a specifically placed device using the device identification (such as, MAC address). The message indicates to the specific device to provide a user observable indicator. A user observable indicator can be visual, audible or any other means that allows for the mobile computing device or a user of the mobile computing device to confirm the indicator. Once the indicator has been received, the mobile computing device can confirm the placement of the device on the plan or floor plan.

Many different embodiments for device identification and placement are possible. One embodiment includes sending a command to the target device to identify itself, after which the device responds with a visual or audio or other signal. To facilitate mass verification of device identity and placement, an embodiment includes a bulk process that includes instructing each device in a floor plan, selected in an order (for an embodiment, the order includes a serpentine order), to respond and identify itself. For an embodiment, the serpentine order proceeds down one row of devices, verifying each device at a time, and when the last device in the row is processed, the last device on the next row is selected. This procedure ensures that the next device to be verified is physically close to the prior device. The process continues automatically and un-attended until all devices have been verified. To further speed up the verification and identification process (and verifying that radio communications is established with each device), at least some embodiment include capabilities to issue wireless commands to all devices to turn off/on the light simultaneously, or selected devices from the software user interface to do the same.

Figure 2:
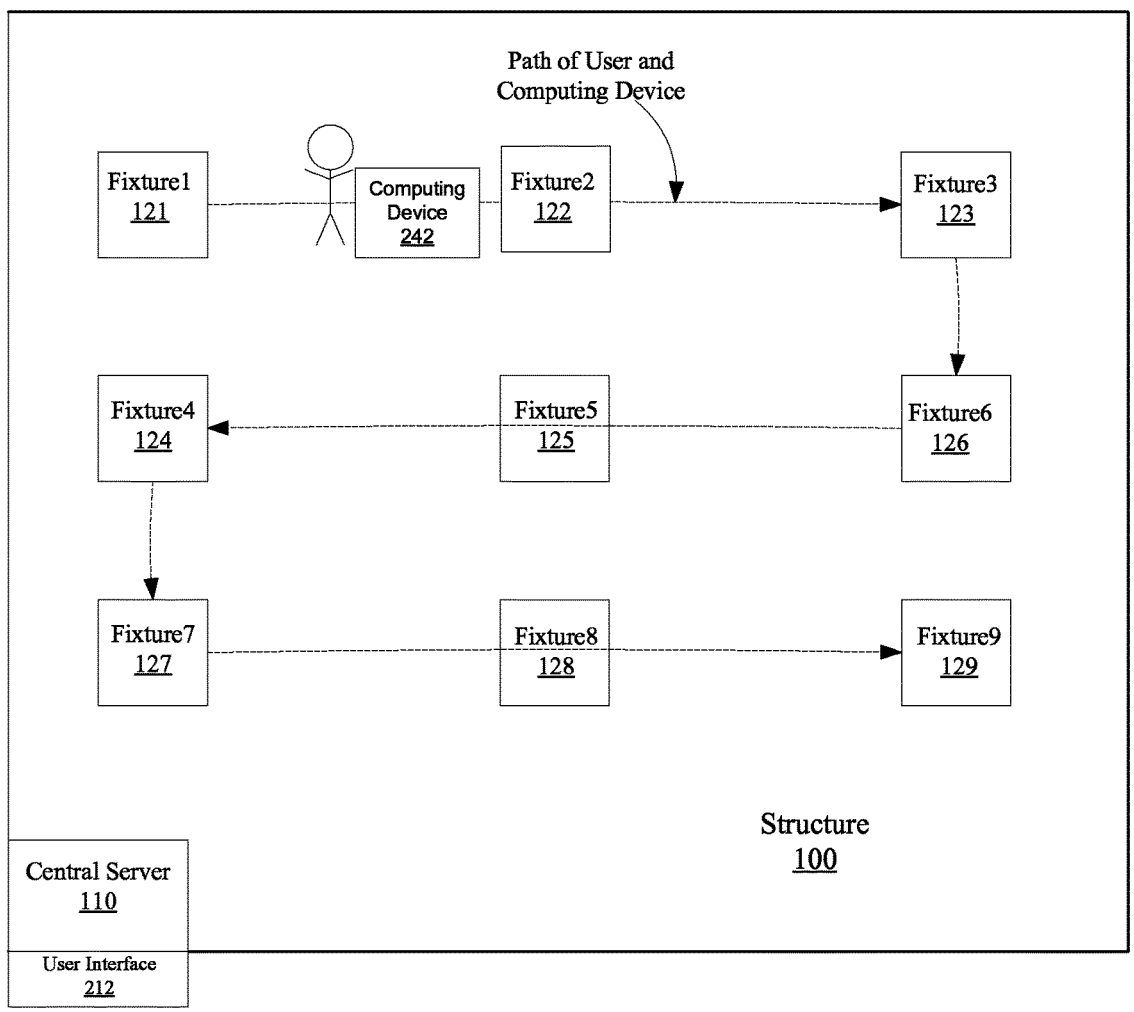
FIG. 2 shows a mobile computing device traveling path along rows of fixtures, and recording locations of identified devices, according to an embodiment.

FIG. 2 shows a mobile computing device traveling path along rows of fixtures, and recording locations of identified devices, according to an embodiment. By tracking the location(s) of the computing device 242 as the computing device travels proximate to the devices 121-129 (fixtures or sensor units), locations of the 121-129 devices (fixtures or sensor units) can be determined and recorded. That is, the computing device 242 is operative to track a location of the computing device within the area that includes the devices 121-129 (fixtures or sensor units). As the computing device 242 travels, the computing device 242 is operative to couple with a least one of a plurality of sensor units. In response to the coupling with a sensor unit, the sensor unit responds with an identifier, that uniquely identifies the sensor unit. Based on the responded identifier, either the computing device, or a central or backend server (such as, central server 110) identifies and records a location of the at least one of the plurality of sensor units based on a tracked location of the computing device and an identifier of the at least one of the plurality of sensor units.

For an embodiment, the computing device receives the identifier directly from the least one of a plurality of sensor units. For an embodiment, the backend server receives the identifier from the least one of a plurality of sensor units through a network connection.

Tracking the Location(s) of the Computing Device

For at least some embodiments, tracking the location of the computing device includes establishing a reference location of the computing device, sensing, by a plurality of accelerometers of the computing device, acceleration of the of the computing device, and tracking the location of the computing device based on the reference location and the sensed acceleration of the computing device.

For at least some embodiments, the location of the computing device is tracked by sensing a direction of wheels of a cart associated with the computing device, and measuring rotations of wheels of the cart. For at least some embodiments, the location of the computing device is tracked using optical signals, similar to optical mouse technology to track location of computing device.

At least some embodiments further include downloading a reflected ceiling plan of the area to the computing device, and displaying the reflected ceiling plan of the area of a user of the computing device. For at least some embodiments, the reflected ceiling plan includes locations of the sensor units but not identifications of at least some of the sensor units. For at least some embodiments, the tracked location of the computing device is displayed on the computing device over the reflected ceiling plan, thereby allowing the user to identify when the tracked location of the computing device deviates relative to known locations of the sensor units of the reflected ceiling plan. At least some embodiments further include receiving one or more location reference resets from the user during the tracking of the location of the computing device. For at least some embodiments, the tracking of the location of a computing device within the area is further based on the location reference resets and the sensed acceleration of the computing device.

Figure 3A:
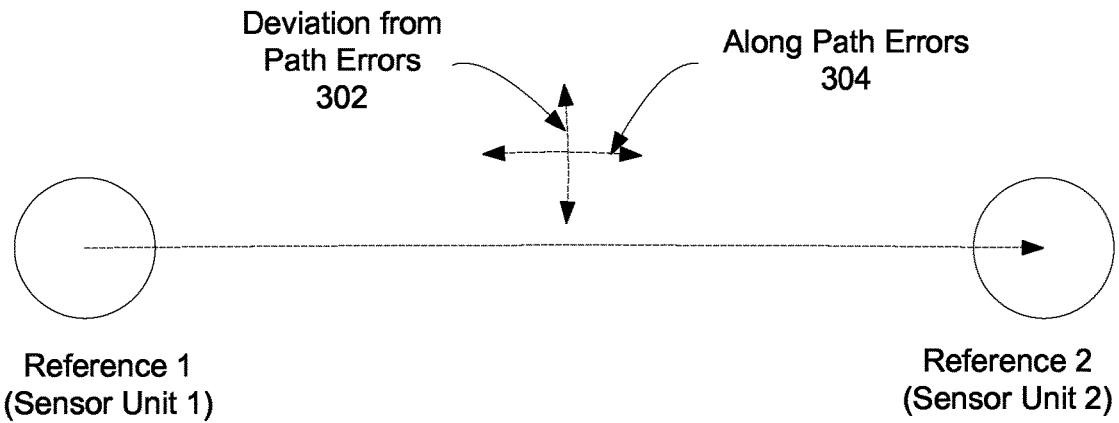
FIG. 3A shows a path of a mobile computing device between devices or sensors that are designated as reference devices, according to an embodiment.

FIG. 3A shows a path of a mobile computing device between devices or sensors that are designated as reference devices, according to an embodiment. As shown, the computing device travels between a first reference 1 (sensor unit 1) and a second reference 2 (sensor unit 2). If within an open area, the operator of the computing device can maintain a near straight line between the references (reference 1 and reference 2). The references designate sensor units in which the location of the sensor units is precisely known. Therefore, based on these references, the computing device can estimate locations between the references base on the references, and sensed motion of the computing device. Assuming the operator travels a near-straight line between the references, the deviation from the path errors as depicted by the arrow 302 can be assume to be small. Therefore, the focus of the location tracking can be on the errors along the path as depicted by the arrow 304.

For at least some embodiments, tracking the location of the computing device includes determining a first reference position and a second reference position of a path to be traveled by the computing device, and straight line approximating the path of the computing device between the first reference position and the second reference position.

Figure 3B:
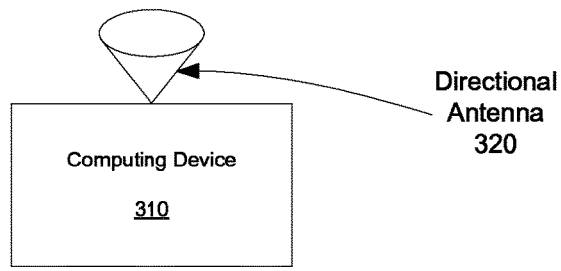
FIG. 3B shows mobile computing device that includes a directional antenna, according to an embodiment.

FIG. 3B shows mobile computing device 310 that includes a directional antenna 320, according to an embodiment. The directional antenna advantageously provides focused communication between the computing device 310, and a sensor unit that is, for example, directly above the computing device 310. That is, for example, radio frequency (RF) signals communicated from the computing device 310 are received with a strongest signal strength by the sensor unit directly in the path or focus of the directional antenna. Therefore, neighboring sensor units not directly in the path of the signal transmitted from the directional antenna will receive a much weaker RF signal than the sensor unit that is in the direction of the directional antenna. This is desirable because only the sensor unit in the path of the directional antenna will respond with the identifier, and the location of the responding sensor unit can be correctly identified and recorded.

For at least some embodiments, a directional antenna is associated with the computing device 310, and a further comprising approximating a location of the computing device 310 along the straight line path based on a receive signal strength of signals received from one or more of the plurality of sensor units. That is, as described above, when the computing device 310 is following a straight line path between, for example, to references, the greatest possibility for error is in errors along the path as depicted by the arrow 304. The directional antenna provides for high signal strength of a communication signal received from a sensor unit, when the sensor unit is within the direction of the directional antenna of the computing device 310. That is, the computing device is able to determine, for example, that the computing device 310 is directly under the sensor unit that the communications signal is being received from.

At least some embodiments further include compensating for drift of location estimation of the computing device 310 by re-referencing the location estimation based upon a reflected ceiling plan that includes the plurality of sensors, and the straight line approximation and the location approximation of the receive signal strength of signals received from one or more of the plurality of sensor units.

Figure 3C:
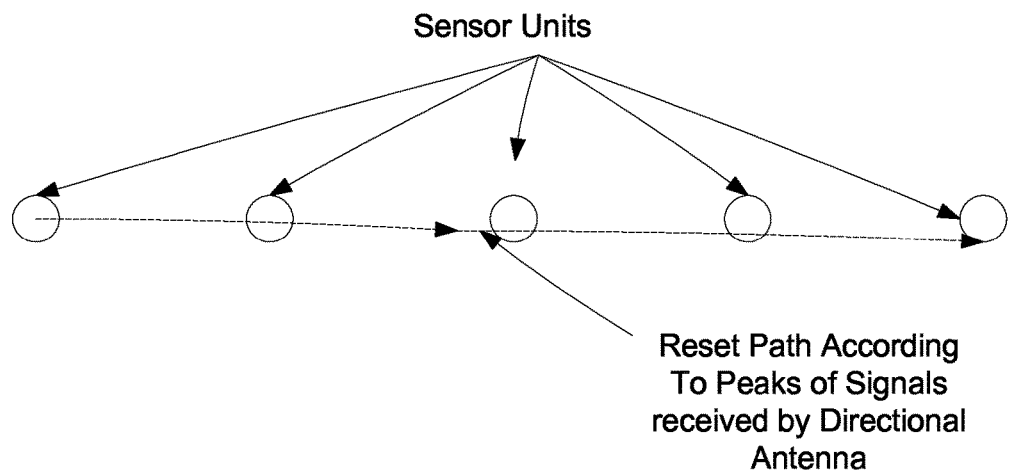
FIG. 3C shows a path of a mobile computing device as the mobile computing device travels along a path of multiple devices (sensor units), according to an embodiment.

FIG. 3C shows a path of a mobile computing device as the mobile computing device travels along a path of multiple devices (sensor units), according to an embodiment. As shown, the path traveled by the computing device is proximate to a series of sensor units that is near-linear. As the computing device travels between references sensor units, the signal strength of signals received from the sensor units is used to accurately estimate when the computing device is proximate or just under a particular sensor unit. That is, peaks of signals received by the directional antenna of the computing device are used to aid in the determination of the location(s) of the sensor units.

Figure 4:
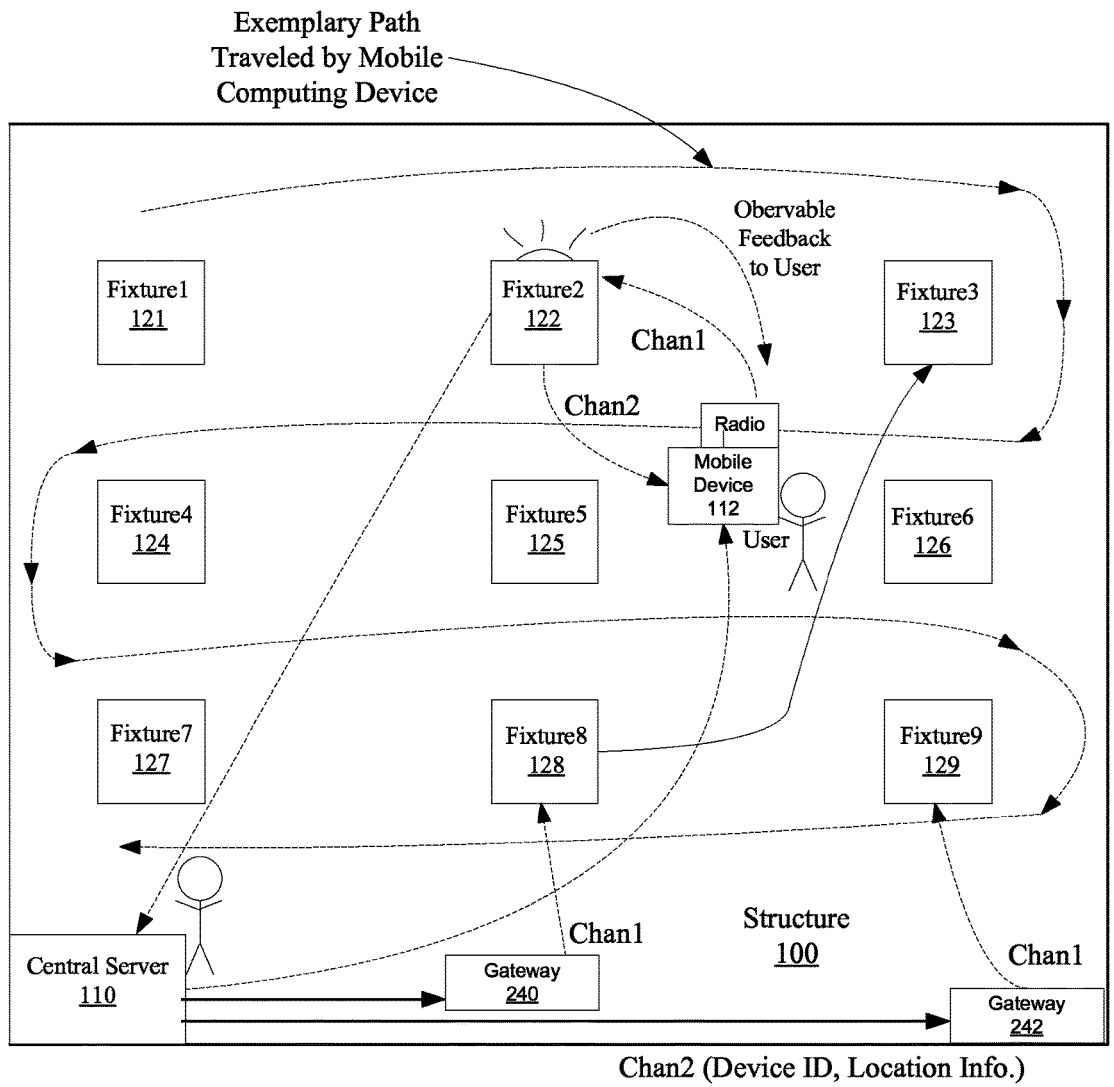
FIG. 4 shows a central server communicating the mobile computing device and with the devices of the structure while the mobile computing device travels along a path, according to an embodiment.

FIG. 4 shows a central server 110 communicating with the devices 121-129 of the structure 110 after the devices 121-129 have been placed in the structure, according to an embodiment. For an embodiment, the central server 110 is network connected to gateways 240, 242. The gateways 240, 242 then communicate with the devices 121-129. Some of the devices 121-129 will naturally be located farther away, or otherwise have inferior quality links to the gateways 240, 242. Accordingly, for an embodiment, certain of the devices are designated as repeater devices. For an embodiment, certain of the devices are designated as repeater devices based on the proximity of the devices to gateways and other device as determined by the placement of the devices and gateways on the plan or floor plan. For example, in FIG. 4, device 128 is designated as a repeater device. When, for example, gateway 240 communicates with device 123, the gateway 240 communicated through the repeater device 128 to the device 123.

As shown, for an embodiment, the central server 110 communication over a first channel (Chan 1) to the devices (fixtures or sensor units) 121-129 (which can be through the gateways 240, 242). Further, for an embodiment, the communication from the mobile device 112 to a particular sensor unit (device or fixture) 122 is over the same channel (Chan 1). Further, for an embodiment, the sensor unit (device or fixture) 122 communicates back to the mobile device 112 through a second channel (Chan 2). Further, for an embodiment, the sensor unit (device or fixture) 122 provides an observable feedback (such as, a light or audible sound) to the user of the mobile device 112, thereby allowing the user to observer that the communication from the mobile device 112 to the sensor unit 122 has been successfully completed. As previously stated, the identifier that uniquely identifies the sensor unit 122 that is transmitted by the sensor unit 122 can be communicated back to the central controller 110 or directly back to the mobile device 112.

Figure 5:
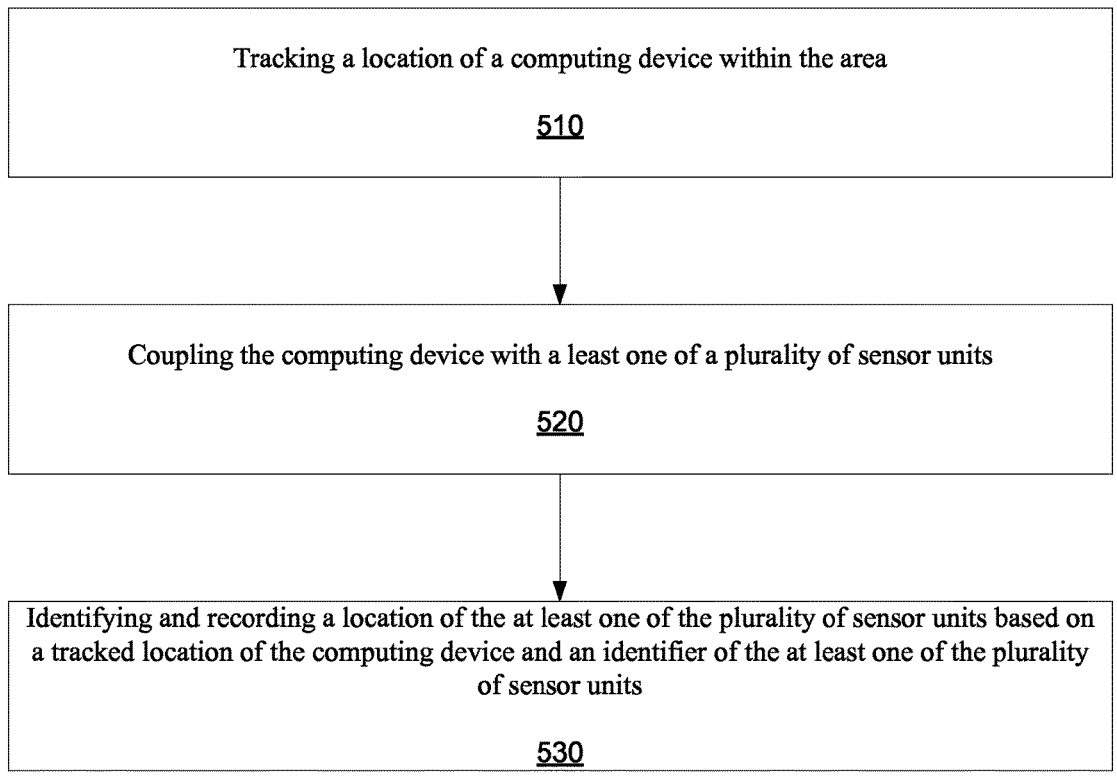
FIG. 5 is a flow chart that includes steps of a method of commissioning sensor units (devices and/or fixtures) within an area, according to an embodiment.

FIG. 5 is a flow chart that includes steps of a method of commissioning sensor units (devices) within an area, according to an embodiment. A first step 510 includes tracking a location of a computing device within the area. A second step 520 includes coupling the computing device with a least one of a plurality of sensor units. A third step 530 includes identifying and recording a location of the at least one of the plurality of sensor units based on a tracked location of the computing device and an identifier of the at least one of the plurality of sensor units.

For at least some embodiments, coupling the computing device includes establishing radio frequency (RF) communication with the at least one of the plurality of sensor units. For at least some embodiments, coupling the computing device includes establishing communication with the at least one of the plurality of sensor units through a sensor of the at least one of the plurality of sensor units.

For at least some embodiments, the computing device receives the identifier directly from the least one of a plurality of sensor units. For at least some embodiments, a backend server receives the identifier from the least one of a plurality of sensor units through a network connection. For at least some embodiments, the backend server communicates the identifier from the least one of a plurality of sensor units to the computing device.

For at least some embodiments, tracking the location of the computing device includes establishing a reference location of the computing device, sensing, by a plurality of accelerometers of the computing device, acceleration of the of the computing device, and tracking the location of the computing device based on the reference location and the sensed acceleration of the computing device.

For at least some embodiments, tracking the location of the computing device includes determining a first reference position and a second reference position of a path to be traveled by the computing device, and straight line approximating the path of the computing device between the first reference position and the second reference position.

For at least some embodiments, a directional antenna is associated with the computing device, and a further comprising approximating a location of the computing device along the straight line path based on a receive signal strength of signals received from one or more of the plurality of sensor units. At least some embodiments further include compensating for drift of drift of location estimation of the computing device by re-referencing the location estimation based upon a reflected ceiling plan that includes the plurality of sensors, and the straight line approximation and the location approximation of the receive signal strength of signals received from one or more of the plurality of sensor units.

For at least some embodiments, the location of the computing device is tracked by sensing a direction of wheels of a cart associated with the computing device, and measuring rotations of wheels of the cart. For at least some embodiments, the location of the computing device is tracked using optical signals, similar to optical mouse technology to track location of computing device.

At least some embodiments further include downloading a reflected ceiling plan of the area to the computing device, and displaying the reflected ceiling plan of the area of a user of the computing device. For at least some embodiments, the reflected ceiling plan includes locations of the sensor units but not identifications of at least some of the sensor units. For at least some embodiments, the tracked location of the computing device is displayed on the computing device over the reflected ceiling plan, thereby allowing the user to identify when the tracked location of the computing device deviates relative to known locations of the sensor units of the reflected ceiling plan. At least some embodiments further include receiving one or more location reference resets from the user during the tracking of the location of the computing device. For at least some embodiments, the tracking of the location of a computing device within the area is further based on the location reference resets and the sensed acceleration of the computing device.

For at least some embodiments, the identified and recorded location of the at least one of the plurality of sensor units is uploaded to a central server.

For at least some embodiments, identifying the at least one of the plurality of sensor units comprises receiving one or more electromagnetic signals that include sensor unit identifiers from at least a subset of the plurality of sensor units, and selecting that at least one of the plurality of sensor units from the plurality of sensor units based on a received signal strength indicator (RSSI) of the received one or more electromagnetic signals. For at least some embodiments, the identification of the at least one of the plurality of sensor units is included within a MAC (media access control) address included within the received one or more electromagnetic signals.

For at least some embodiments, identifying the at least one of the plurality of sensor units comprises receiving an identification of the at least one of the plurality of sensor units from an operator of the computing device who visually reads and inputs the identification.

Figure 6:
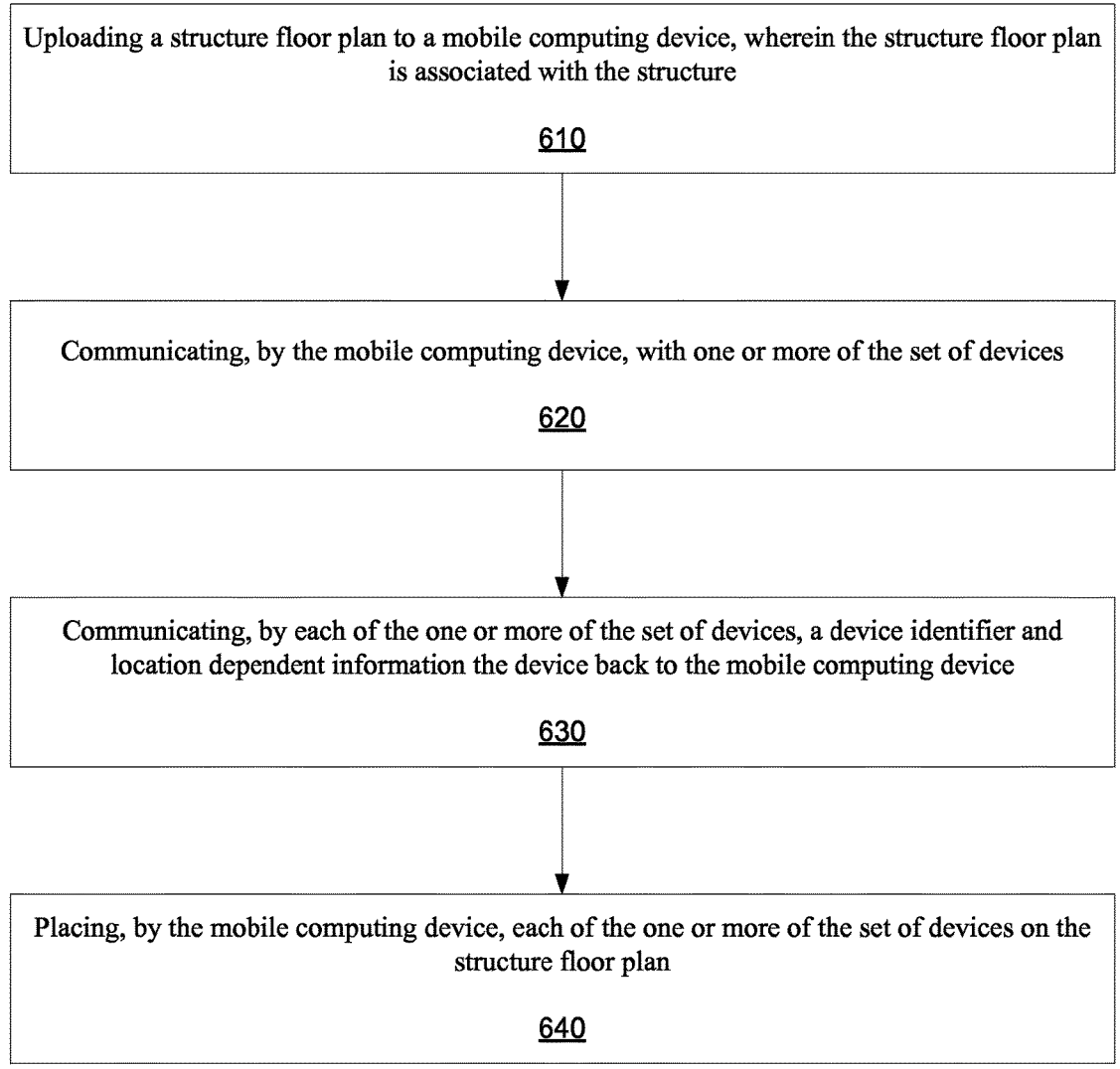
FIG. 6 is a flow chart that includes steps of a method of configuring a set of devices of a structure, according to an embodiment.

FIG. 6 is a flow chart that includes steps of a method of configuring a set of devices of a structure, according to an embodiment. A first step 610 includes loading a structure plan to a mobile computing device, wherein the structure plan is associated with the structure. A second step 620 includes communicating, by the mobile computing device, with one or more of the set of devices. A third step 660 includes communicating, by each of the one or more of the set of devices, a device identifier and proximity dependent information the device back to the mobile computing device, wherein the proximity dependent information allows the mobile computing device to estimate a proximate location of the device. A fourth step 640 includes placing, by the mobile computing device, each of the one or more of the set of devices on the structure floor plan based at least in part on the proximity dependent information.

An embodiment further includes each of the one or more of the set of devices, communicating an observable feedback to an operator of the mobile computing device. As previously describe, the observable feedback can be visual, audible, or any other means of feedback that the user of the mobile computing device, or the mobile computing device itself can receive, and therefore, confirm placement of the device providing the observable feedback.

For an embodiment, the mobile computing device includes a user interface that more readily allows the user of the mobile computing device to confirm locations of each of the devices. For an embodiment, the user interface of the mobile computing device provides an in-range list of devices. The in-range list includes the devices that are within the communication range of, for example, wireless communication from the mobile computing device to the devices. For an embodiment, the list of devices of the in-range list, are listed in an estimated order of proximity to the mobile computing device. The proximity can be estimated, for example, based on the link quality between the mobile computing device and each of the devices.

For an embodiment, the user interface allows the user to select a device from the list, and further, communicate a command to the device, wherein the device provides a user-observable feedback in response to being selected. Further, the user interface can easily allow the user to then select the next device of the list for placement confirmation.

For an embodiment, once the mobile computing device has placed each of the devices on the plan, the mobile computing device then uploads the placement of each of the one or more of the set of devices on the structure floor plan to a central server. An embodiment can further include the central server confirming or supplementing the placements of one or more of the set of devices on the structure floor plan through activation of a user-selected device of the one or more of the set of device. An embodiment further includes providing a user-interface that depicts at least a portion of the structure floor plan and at least a portion of the set of devices, and further depicts the user-selected device, and further facilitates communication to the user-selected device. An embodiment further includes providing a capability to record meta data and other information (such as diagnostic data) about each device on a floorplan, either in the mobile computing device or central server or both. This capability enables, for example, a "punchlist" (a list of diagnostic problems) of the sensor devices to be created and maintained, which will simplify the repair process and overall maintenance of the sensor devices. That is, the responses of the devices to the communication by the mobile computing device can include information related to the operating condition and health of the device. The operating condition and health information of each device can be used by a system operator to schedule maintenance of the devices. The operating condition and health information of each device can be used to identify problem conditions associated with the devices.

For an embodiment, the mobile computing device communicates with the one or more of the set of devices through a wireless channel that a central server or a gateway uses to communicate with each of the set of devices. This saves resources because each of the devices already has the electronics required to communicate with the central server or gateways connected to the central server. That is, an extra channel for communication between the mobile computing device and each device is not required. An existing communication channel is utilized.

As previously described, and embodiment further includes physically transporting the mobile computing device about the structure, and the mobile computing device communicating with one or more of the set of devices. As previously described, the mobile computing device receives a device identifier and proximity dependent information back from the devices. For an embodiment, the proximity dependent information includes a received signal strength of communication received by the device. For an embodiment, the proximity dependent information includes a Link Quality Indicator of communication received by the device. For an embodiment, the device identifier includes a MAC address of the device.

As previously described, an embodiment further includes designating at least a portion of the set of devices as repeater devices, wherein repeater devices receive communication signals from either a gateway or another repeater device, and transmit the communication signals to another device. For an embodiment, the gateway device is located on the floor plan, and the portion of the set of devices are designated as repeater devices based on a proximity of the portion of the set of devices relative to the gateway.

While the devices have been described generally, for an embodiment, the devices are lighting fixtures that are controllable, for example, by the central server. Further, for at least some embodiment, the lighting fixtures include sensors.

An embodiment further includes a network setup being executed after the placement of the devices on the floor plan has been completed. The network setup can include associating certain devices with particular gateways, thereby establishing groups of devices. As described, the central controller can then communication with particular groups through corresponding gateways.

An embodiment further includes the central controller initiating or causing the devices to provide a sequential user observable feedback after all of the devices have been placed. That is, each device sequentially generates a user observable feedback that allows a user to confirm the placement of the devices. For example, the lighting of lighting devices can be sequentially performed to allow the user to confirm that each device has been properly placed on a floor plan of a building.

Figure 7:
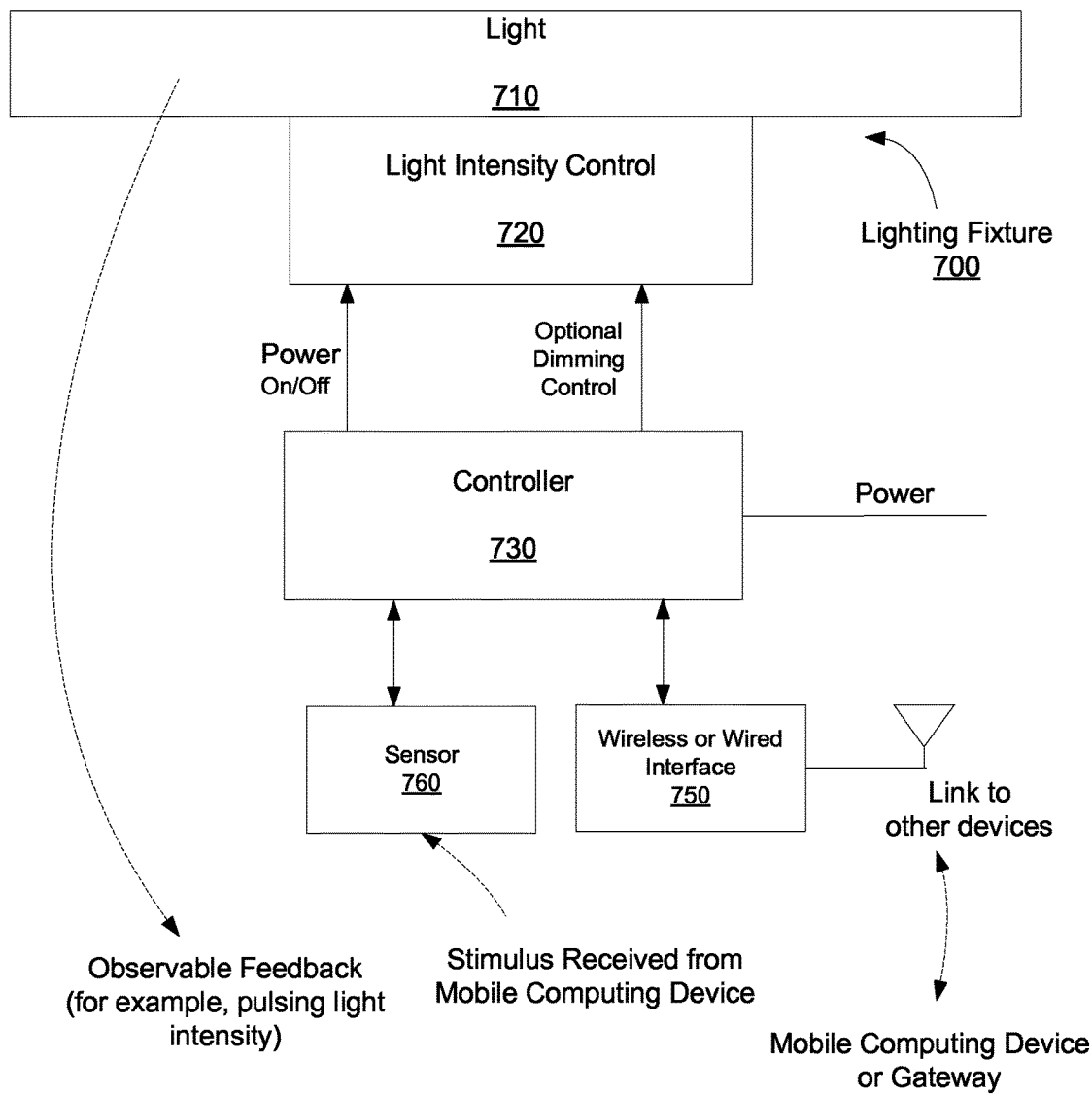
FIG. 7 shows a lighting device, according to an embodiment.

FIG. 7 shows a lighting device (lighting fixture 700), according to an embodiment. As shown, this embodiment includes a light 710, a light intensity controller 720, a controller 730, and a communications interface 750. The intensity of light emitted from the light is controlled by the light intensity controller 720 which can be of different forms depending, for example, if the light 710 is an LED (light emitting diode) or florescent light.

For at least some embodiments, the controller 730 is operative to communicate with external devices (such as, a gateway or the mobile computing device) through the communications interface 750. For an embodiment, the communications interface 750 includes a wireless communication interface.

The controller 730 is further operative to receive commands and react accordingly. For an embodiment, when the controller 730 receives a first command from the mobile computing device, the controller 730 transmits back to the mobile computing device the device identifies and proximity dependent information of the lighting fixture 700. Further the controller 730 can provide user observable feedback, thereby indicating to a user that the lighting fixture has received the first command. For an embodiment, the controller 730 is further operative to provide the user-observable feedback to the mobile computing device upon receiving communication specifically for the lighting fixture as identified by the device identifier (for example, MAC address). As described, the user-observable feedback can take one of many different forms, but one form includes controlling the intensity of emitted light, which can be observer by the user of the mobile computing device.

Figure 8:
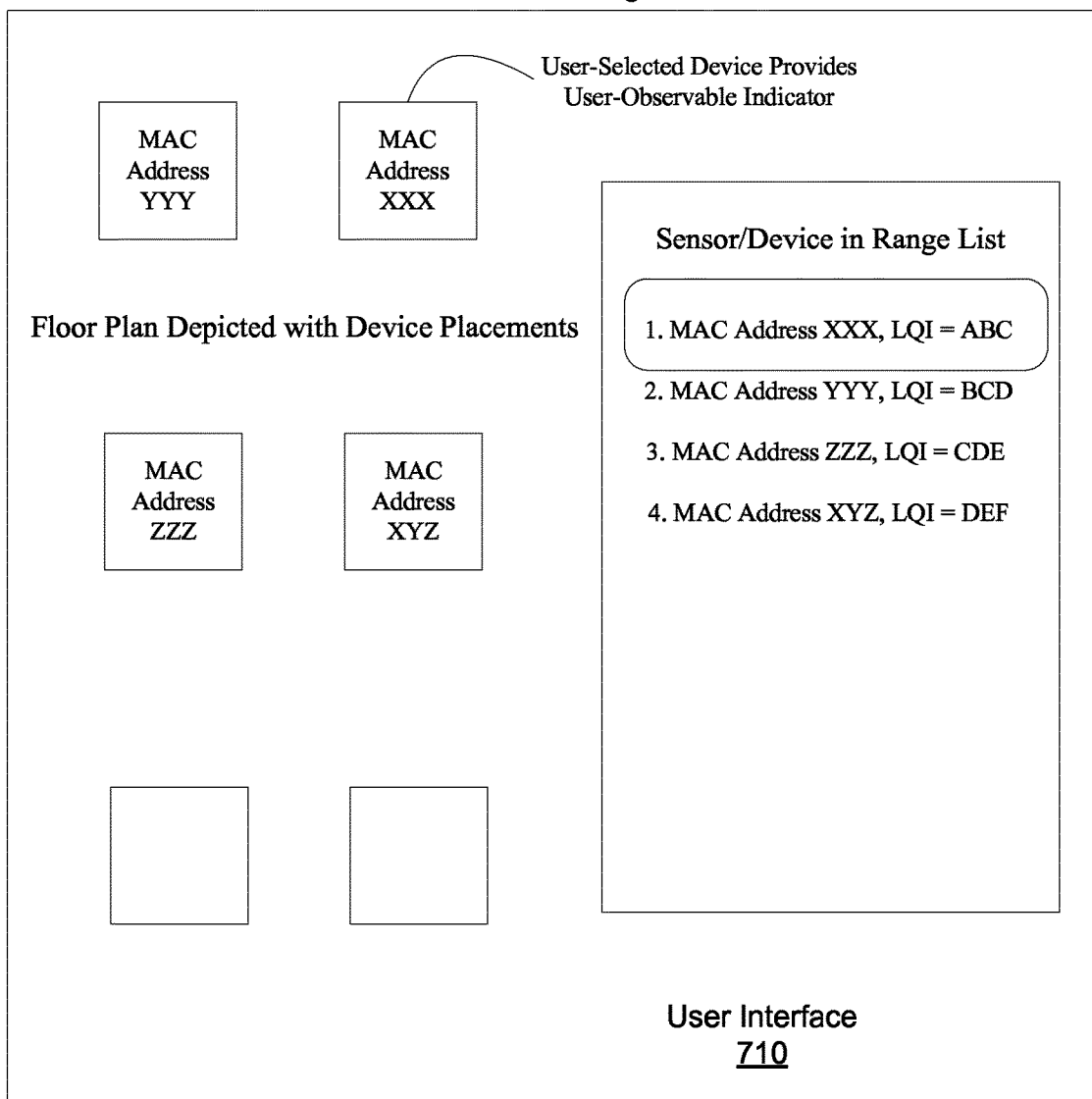
FIG. 8 shows a user interface of a mobile computing device that facilitates placements of the devices on the plan, according to an embodiment.

FIG. 8 shows a user interface 810 of a mobile computing device that facilitates placements of the devices on the plan, according to an embodiment. There are many different forms that the user interface can take. For an embodiment, the user interface includes at least a portion of a floor plan of a building (structure) in which placement of devices is being performed. The user interface can provide a visual depiction of the placed devices and their corresponding MAC addresses. The user can then select a device, and the mobile computing device sends the selected device a command. Upon receiving the command, the device provides the user observable feedback.

For an embodiment, the user interface includes a device in-range list. For an embodiment, the device in-range list orders the devices according to the signal quality of the communication signal receive from the mobile computing device. It can be inferred that the devices having the best link quality are the closest or most proximate to the mobile computing device. The user of the mobile computing device can then select a device from the device in-range list for confirmation of placement. Once confirmation of a device has been made, the list can then move to the next device on the list for confirmation.

As previously described, the in-range list can be varied or adjusted by varying or adjusting the transmit power of the mobile computing device. That is, by varying the transmit power of the mobile computing device, the number of devices that receive the communication from the mobile computing device is adjusted. Accordingly, the size of number of devices of the in-range list can by controllably adjusted. Further, the response times of the devices can be adjusted.

Although specific embodiments have been described and illustrated, the described embodiments are not to be limited to the specific forms or arrangements of parts so described and illustrated. The embodiments are limited only by the appended claims.

What is claimed:

1. A method of commissioning sensor units within an area, comprising:
   tracking a location of a computing device within the area;
   coupling the computing device with a least one of a plurality of sensor units;
   identifying and recording a location of the at least one of the plurality of sensor units based on a tracked location of the computing device and an identifier of the at least one of the plurality of sensor units;
   downloading a plan of the area to the computing device, and displaying the plan of the area to a user of the computing device, wherein the plan provides for placement of the plurality of sensor units, but does not include exact or precise knowledge of which sensor units are placed at which location within the area;
   confirming, by the computing device, placement of a specific sensor unit on the plan of the area comprising:
   providing an in-range list of sensor units on a user-interface of the computing device, wherein the in-range list includes an estimated order of proximity of each of the plurality of sensors to the computing device based on an estimated proximate location of each of the plurality of sensor units, wherein the user-interface allows the user of the computing device to select the specific sensor unit from the in-range list;
   communicating a command to the specific sensor unit, wherein the specific sensor unit provides a user-observable feedback in response to being selected, wherein observable feedback allows the user to identify and place the specific sensor unit on the loaded floor plan; and
   wherein identifying and recording a location of the at least one of the plurality of sensor units based on a tracked location of the computing device and an identifier of the at least one of the plurality of sensor units comprises the computing device communicating with the at least one of the plurality of sensor units, and receiving one or more electromagnetic signal responses that include sensor unit identifiers from at least a subset of the plurality of sensor units, wherein a timing of the one or more electromagnetic signal responses is selected based on an address of each of the plurality of sensor units.

2. The method of claim 1, wherein coupling the computing device includes establishing communication with the at least one of the plurality of sensor units through a sensor of the at least one of the plurality of sensor units.

3. The method of claim 1, wherein the computing device receives the identifier directly from the least one of a plurality of sensor units.

4. The method of claim 1, wherein a backend server receives the identifier from the least one of a plurality of sensor units through a network connection.

5. The method of claim 1, wherein tracking the location of the computing device comprises:
establishing a reference location of the computing device;
sensing, by a plurality of accelerometers of the computing device, acceleration of the of the computing device; and
tracking the location of the computing device based on the reference location and the sensed acceleration of the computing device.

6. The method of claim 1, wherein tracking the location of the computing device comprises:
determining a first reference position and a second reference position of a path to be traveled by the computing device; and
straight line approximating the path of the computing device between the first reference position and the second reference position.

7. The method of claim 6, wherein a directional antenna is associated with the computing device, and a further comprising approximating a location of the computing device along the straight line path based on a receive signal strength of signals received from one or more of the plurality of sensor units.

8. The method of claim 7, further comprising compensating for drift of location estimation of the computing device by re-referencing the location estimation based upon a reflected ceiling plan that includes the plurality of sensors, and the straight line approximation and the location approximation of the receive signal strength of signals received from one or more of the plurality of sensor units.

9. The method of claim 1, wherein the location of the computing device is tracked by sensing a direction of wheels of a cart associated with the computing device, and measuring rotations of wheels of the cart.

10. The method of claim 1, further comprising downloading a reflected ceiling plan of the area to the computing device, and displaying the reflected ceiling plan of the area of a user of the computing device.

11. The method of claim 10, wherein the reflected ceiling plan includes locations of the sensor units but not identifications of at least some of the sensor units.

12. The method of claim 10, wherein the tracked location of the computing device is displayed on the computing device over the reflected ceiling plan, thereby allowing the user to identify when the tracked location of the computing device deviates relative to known locations of the sensor units of the reflected ceiling plan.

13. The method of claim 12, further comprising receiving one or more location reference resets from the user during the tracking of the location of the computing device.

14. The method of claim 13, wherein the tracking of the location of a computing device within the area is further based on the location reference resets and a sensed acceleration of the computing device.

15. The method of claim 1, wherein the identified and recorded location of the at least one of the plurality of sensor units is uploaded to a central server.

16. The method of claim 1, wherein identifying the at least one of the plurality of sensor units comprises receiving one or more electromagnetic signals that include sensor unit identifiers from at least a subset of the plurality of sensor units, and selecting that at least one of the plurality of sensor units from the plurality of sensor units based on a received signal strength indicator (RSSI) of the received one or more electromagnetic signals.

17. The method of claim 16, wherein the identification of the at least one of the plurality of sensor units is included within a MAC (media access control) address included within the received one or more electromagnetic signals.

18. The method of claim 1, wherein identifying the at least one of the plurality of sensor units comprises receiving an identification of the at least one of the plurality of sensor units from an operator of the computing device who visually reads and inputs the identification.

19. A computing apparatus, the computing apparatus operative to:
track a plurality of locations of the computing apparatus while the computing apparatus is traveling within an area;
couple with at least one of a plurality of sensor units;
receive an identifier from the at least one of the plurality of sensor units after coupling with the at least one of a plurality of sensor units;
identify and record a location of the at least one of the plurality of sensor units based on a tracked plurality of locations of the computing apparatus and the identifier of the at least one of the plurality of sensor units
download a plan of the area, and display the plan of the area to a user of the computing apparatus, wherein the plan provides for placement of the plurality of sensor units, but does not include exact or precise knowledge of which sensor units are placed at which location within the area;
confirm placement of a specific sensor unit on the plan of the area comprising:
providing an in-range list of sensor units on a user-interface of the computing device, wherein the in-range list includes an estimated order of proximity of each of the plurality of sensors to the computing device based on an estimated proximate location of each of the plurality of sensor units, wherein the user-interface allows the user of the computing device to select the specific sensor unit from the in-range list;
communicating a command to the specific sensor unit, wherein the specific sensor unit provides a user-observable feedback in response to being selected, wherein observable feedback allows the user to identify and place the specific sensor unit on the loaded floor plan; and
wherein identifying and recording a location of the at least one of the plurality of sensor units based on a tracked location of the computing device and an identifier of the at least one of the plurality of sensor units comprises the computing device communicating with the at least one of the plurality of sensor units, and receiving one or more electromagnetic signal responses that include sensor unit identifiers from at least a subset of the plurality of sensor units, wherein a timing of the one or more electromagnetic signal responses is selected based on an address of each of the plurality of sensor units.

20. The computing apparatus of claim 19, wherein coupling the computing apparatus includes establishing communication with the at least one of the plurality of sensor units through a sensor of the at least one of the plurality of sensor units.

21. The computing apparatus of claim 19, wherein the computing apparatus receives the identifier directly from the least one of a plurality of sensor units.

22. The computing apparatus of claim 19, wherein a backend server receives the identifier from the at least one of a plurality of sensor units through a network connection, and the backend server communicates the identifier to the computing apparatus.

* * * * *